(12) United States Patent
Green et al.

(10) Patent No.: US 8,481,322 B2
(45) Date of Patent: Jul. 9, 2013

(54) METHOD FOR MARKING LIQUID HYDROCARBONS AND OTHER FUELS AND OILS

(75) Inventors: George David Green, Cary, IL (US); Raymond John Swedo, Mt. Prospect, IL (US)

(73) Assignee: ANGUS Chemical Company, Buffalo Grove, IL (US)

( * ) Notice: Subject to any disclaimer, the term of this patent is extended or adjusted under 35 U.S.C. 154(b) by 232 days.

(21) Appl. No.: 13/113,493

(22) Filed: May 23, 2011

(65) Prior Publication Data

US 2011/0290997 A1    Dec. 1, 2011

Related U.S. Application Data

(60) Provisional application No. 61/348,778, filed on May 27, 2010.

(51) Int. Cl.
*G01N 33/24* (2006.01)

(52) U.S. Cl.
USPC ............... 436/27; 436/56; 436/60; 436/139; 436/141

(58) Field of Classification Search
None
See application file for complete search history.

(56) References Cited

U.S. PATENT DOCUMENTS

| | | | |
|---|---|---|---|
| 5,981,283 | A | 11/1999 | Anderson et al. |
| 2004/0092738 | A1 | 5/2004 | Park et al. |
| 2007/0184555 | A1 | 8/2007 | Banavali et al. |

FOREIGN PATENT DOCUMENTS

EP    512404    11/1992

OTHER PUBLICATIONS

Ansari, et al., "Combination synthesis and Antibacterial Evaluation of an Indexed Chalcone Library", Chemistry & Biodiversity, vol. 2, pp. 1656-1664 (2005).
Cocconcelli, et al., "Aryl azoles wiht neuroprotective activity—Parallel synthesis and attempts at target identification", Science Direct, vol. 16, pp. 2043-2052, (2008).
Lyle, et al., "Acid-catalyzed Condensationas. II. The Condensation of Benzaldehyde with Substituted Acetophenones", Department of Chemistry, University of New Hampshire, (1955).
Bradsher, et al., "Some New Chalcones", Department of Chemistry, Duke University, p. 3570, (1949).

*Primary Examiner* — Robert Xu
(74) *Attorney, Agent, or Firm* — Kenneth Crimaldi

(57) ABSTRACT

A method for marking a petroleum hydrocarbon, biodiesel fuel or ethanol fuel by adding to the petroleum hydrocarbon, biodiesel fuel or ethanol fuel at least one compound having formula (I)

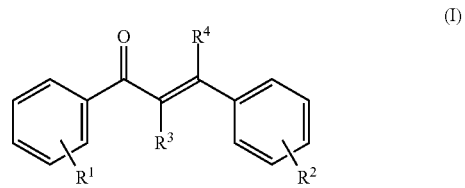

wherein $R^1$ and $R^2$ independently represent at least one substituent selected from the group consisting of hydrogen, $C_1$-$C_{12}$ alkyl, $C_1$-$C_{12}$ alkoxy and nitro; and $R^3$ and $R^4$ independently represent hydrogen, methyl or ethyl.

10 Claims, No Drawings

METHOD FOR MARKING LIQUID HYDROCARBONS AND OTHER FUELS AND OILS

This application claims the benefit of priority under 35 U.S.C. §119(e) of U.S. Provisional Patent Application No. 61/348,778 filed on May 27, 2010.

This invention relates to a method for marking liquid hydrocarbons and other fuels and oils.

Marking of petroleum hydrocarbons and other fuels and oils with various kinds of chemical markers is well known in the art. A variety of compounds have been used for this purpose, as well as numerous techniques for detection of the markers, e.g., absorption spectroscopy and mass spectrometry. For example, U.S. Pub. App. No. 2007/0184555 discloses the use of a variety of organic compounds for use in marking liquid hydrocarbons and other fuels and oils. However, there is always a need for additional marker compounds for these products. Combinations of markers can be used as digital marking systems, with the ratios of amounts forming a code for the marked product. Additional compounds useful as fuel and lubricant markers would be desirable to maximize the available codes. The problem addressed by this invention is to find additional markers useful for marking liquid hydrocarbons and other fuels and oils.

STATEMENT OF INVENTION

The present invention provides a method for marking a petroleum hydrocarbon, biodiesel fuel or ethanol fuel; said method comprising adding to said petroleum hydrocarbon, biodiesel fuel or ethanol fuel at least one compound having formula (I)

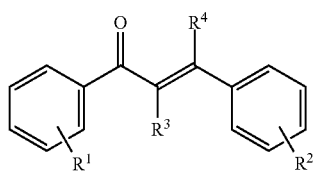

wherein $R^1$ and $R^2$ independently represent at least one substituent selected from the group consisting of hydrogen, $C_1$-$C_{12}$ alkyl, $C_1$-$C_{12}$ alkoxy and nitro; and $R^3$ and $R^4$ independently represent hydrogen, methyl or ethyl.

DETAILED DESCRIPTION

Percentages are weight percentages (wt %) and temperatures are in ° C., unless specified otherwise. Concentrations are expressed either in parts per million ("ppm") calculated on a weight/weight basis, or on a weight/volume basis (mg/L); preferably on a weight/volume basis. The term "petroleum hydrocarbon" refers to products having a predominantly hydrocarbon composition, although they may contain minor amounts of oxygen, nitrogen, sulfur or phosphorus; petroleum hydrocarbons include crude oils as well as products derived from petroleum refining processes; they include, for example, crude oil, lubricating oil, hydraulic fluid, brake fluid, gasoline, diesel fuel, kerosene, jet fuel and heating oil. Marker compounds of this invention can be added to a petroleum hydrocarbon, a biodiesel fuel, an ethanol fuel, or a mixture thereof. A biodiesel fuel is a biologically derived fuel containing a mixture of fatty acid alkyl esters, especially methyl esters. Biodiesel fuel typically is produced by transesterification of either virgin or recycled vegetable oils, although animal fats may also be used. An ethanol fuel is any fuel containing ethanol, in pure form, or mixed with petroleum hydrocarbons, e.g., "gasohol." An "alkyl" group is a substituted or unsubstituted hydrocarbyl group having from one to twenty-two carbon atoms in a linear or branched arrangement. Preferably, the compounds of this invention contain elements in their naturally occurring isotopic proportions.

Each of $R^1$ and $R^2$ may independently represent hydrogen, $C_1$-$C_{12}$ alkyl, $C_1$-$C_{12}$ alkoxy and nitro. Each may represent more than one type of substituent and/or more than one substituent within a certain type. Preferably, $R^1$ and $R^2$ may independently represent at least one substituent selected from the group consisting of hydrogen, $C_1$-$C_4$ alkyl, $C_1$-$C_4$ alkoxy and nitro; preferably hydrogen, $C_1$-$C_2$ alkyl, $C_1$-$C_2$ alkoxy and nitro; preferably hydrogen, methyl, methoxy and nitro. Preferably at least one of $R^1$ and $R^2$ represents a substituent other than hydrogen. Preferably, $R^1$ is hydrogen and $R^2$ represents at least one substituent that is not hydrogen, preferably $R^2$ represents one substituent that is not hydrogen. Especially preferred substituents include methoxy and nitro, especially 4-methoxy and 3-nitro. Preferably, $R^3$ and $R^4$ independently represent hydrogen or methyl, preferably one of $R^3$ and $R^4$ represents hydrogen and the other methyl, preferably $R^4$ is hydrogen and $R^3$ is hydrogen or methyl, preferably both $R^3$ and $R^4$ are hydrogen.

In the method of this invention, preferably the minimum amount of each marker is at least 0.01 ppm, preferably at least 0.05 ppm, preferably at least 0.1 ppm, preferably at least 0.2 ppm. Preferably, the maximum amount of each marker is 50 ppm, preferably 20 ppm, preferably 15 ppm, preferably 10 ppm, preferably 5 ppm, preferably 2 ppm, preferably 1 ppm, preferably 0.5 ppm. Preferably, a marker compound is not detectible by visual means in the marked petroleum hydrocarbon, biodiesel fuel or ethanol fuel, i.e., it is not possible to determine by unaided visual observation of color or other characteristics that the petroleum hydrocarbon, biodiesel fuel or ethanol fuel contains a marker compound. Preferably, a marker compound is one that does not occur normally in the petroleum hydrocarbon, biodiesel fuel or ethanol fuel to which it is added, either as a constituent of the petroleum hydrocarbon, biodiesel fuel or ethanol fuel itself, or as an additive used in that petroleum hydrocarbon, biodiesel fuel or ethanol fuel.

Preferably, the marker compounds have a log P value of at least 3, where P is the 1-octanol/water partition coefficient. Preferably, the marker compounds have a log P of at least 4, preferably at least 5. Log P values which have not been experimentally determined and reported in the literature can be estimated using the method disclosed in Meylan, W. M & Howard, P. H., *J. Pharm. Sci.*, vol. 84, pp. 83-92 (1995). Preferably the petroleum hydrocarbon, biodiesel fuel or ethanol fuel is a petroleum hydrocarbon or biodiesel fuel; preferably a petroleum hydrocarbon; preferably crude oil, gasoline, diesel fuel, kerosene, jet fuel or heating oil; preferably gasoline.

In one embodiment of the invention, the marker compounds are detected by at least partially separating them from constituents of the petroleum hydrocarbon, biodiesel fuel or ethanol fuel using a chromatographic technique, e.g., gas chromatography, liquid chromatography, thin-layer chromatography, paper chromatography, adsorption chromatography, affinity chromatography, capillary electrophoresis, ion exchange and molecular exclusion chromatography. Chromatography is followed by at least one of: (i) mass spectral analysis, and (ii) FTIR. Identities of the marker compounds preferably are determined by mass spectral analysis. Preferably, mass spectral analysis is used to detect the marker compounds in the petroleum hydrocarbon, biodiesel fuel or ethanol fuel without performing any separation. Alternatively, marker compounds may be concentrated prior to analysis, e.g., by distilling some of the more volatile components of a petroleum hydrocarbon or ethanol.

Preferably, more than one marker compound is present. Use of multiple marker compounds facilitates incorporation into the petroleum hydrocarbon, biodiesel fuel or ethanol fuel of coded information that may be used to identify the origin and other characteristics of the petroleum hydrocarbon, biodiesel fuel or ethanol fuel. The code comprises the identities and relative amounts, e.g., fixed integer ratios, of the marker compounds. One, two, three or more marker compounds may be used to form the code. Marker compounds according to this invention may be combined with markers of other types, e.g., markers detected by absorption spectrometry, including those disclosed in U.S. Pat. No. 6,811,575; U.S. Pat. App. Pub. No. 2004/0250469 and EP App. Pub. No. 1,479,749. Marker compounds are placed in the petroleum hydrocarbon, biodiesel fuel or ethanol fuel directly, or alternatively, placed in an additives package containing other compounds, e.g., antiwear additives for lubricants, detergents for gasoline, etc., and the additives package is added to the petroleum hydrocarbon, biodiesel fuel or ethanol fuel.

The compounds of this invention are known and are believed to be commercially available. In any event, the compounds may be prepared by methods well known in the art. For example, acetophenones ($R^3$=H) or their higher homologs ($R^3$=methyl, ethyl) may be condensed with benzaldehydes according to the following equation

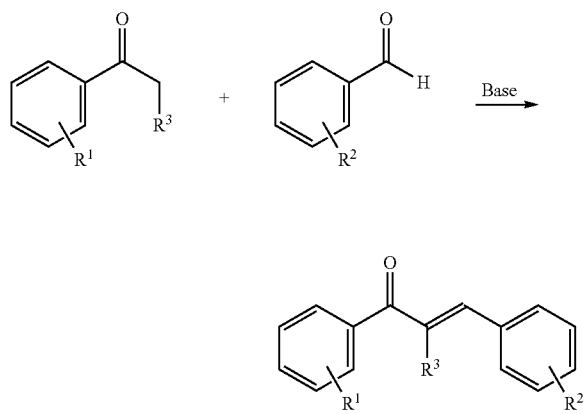

Preferably, an acetophenone is used. Acetophenones or higher homologs may be self-condensed to produce more highly substituted compounds. For example, the following equation illustrates self-condensation of an acetophenone.

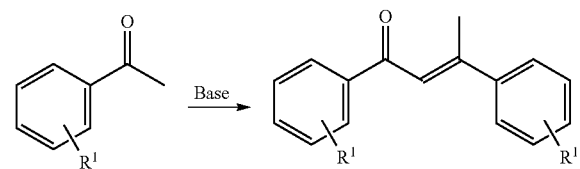

EXAMPLES

Example 1

Stability and Extractability of Marker Compounds

The stability and extractability of two markers of formula I ($R^1$=H, $R^2$=4-$OCH_3$; and $R^1$=H, $R^2$=3-$NO_2$) was performed using xylene solutions containing between 100-1000 ppm makers and an equivalent amount of squalene internal reference standard using the following protocols:

Laundering:

Mix 95 parts marked xylenes with 5 parts laundering agent in a 100 mL vial. Mix gently for 8 hours using a magnetic stir bar. Stop mixing and remove a xylene solution aliquot. Analyze by GC and compare marker response to reference (unlaundered) sample.

Laundering Agents:
1) 5% sulfuric acid
2) 98% sulfuric acid
3) 5% NaOH solution
4) 50% NaOH solution $R^1$=H, $R^2$=4-$OCH_3$ (Compound Ia)

| Sample | marker area | internal standard area | ratio | marker | % change |
|---|---|---|---|---|---|
| control | 130123 | 205460 | 0.63 | 100.00 | 0.00 |
| 5% NaOH | 136571 | 212846 | 0.64 | 101.31 | 1.31 |
| 50% NaOH | 136577 | 212973 | 0.64 | 101.26 | 1.26 |
| 5% $H_2SO_4$ | 93479 | 211968 | 0.44 | 69.63 | −30.37 |
| 98% $H_2SO_4$ | 0 | 213708 | 0.00 | 0.00 | −100.00 |

$R^1$=H, $R^2$=3-$NO_2$ (Compound Ib)

| Sample | marker area | internal standard area | ratio | marker | % change |
|---|---|---|---|---|---|
| control | 93767 | 200860 | 0.47 | 100.00 | 0.00 |
| 5% NaOH | 93666 | 202256 | 0.46 | 99.20 | −0.80 |
| 50% NaOH | 91328 | 193723 | 0.47 | 100.99 | 0.99 |
| 5% $H_2SO_4$ | 58276 | 201231 | 0.29 | 62.04 | −37.96 |
| 98% $H_2SO_4$ | 0 | 203517 | 0.00 | 0.00 | −100.00 |

Example 2

Detection of Compounds Ia and Ib in Gasoline

Compounds Ia and Ib were added to separate samples of a commercial gasoline, purchased from a local Marathon station (87 octane), in a concentration of 0.1 ppm. The marked fuel was analyzed by GC/MS using an Agilent DB-35 ms column-15 meters×0.25 mm ID×0.25 μm. The samples were analyzed using a temperature program starting at 100° C. ramping at 20 C/min to 280 C for a 10 minute hold, followed by a 20 C/min ramp to 340 C with a 6 minute hold then finally a 20 C/min ramp to 360 C with a 1 minute hold time. Compound Ia was readily detected with SIM:238 and Compound Ib was readily detected with SIM:253.

The invention claimed is:
1. A method for marking a petroleum hydrocarbon, biodiesel fuel or ethanol fuel; said method comprising adding to said petroleum hydrocarbon, biodiesel fuel or ethanol fuel at least one compound having formula (I)

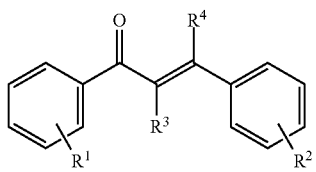

(I)

wherein $R^1$ and $R^2$ independently represent at least one substituent selected from the group consisting of hydrogen, $C_1$-$C_{12}$ alkyl, $C_1$-$C_{12}$ alkoxy and nitro; and $R^3$ and $R^4$ independently represent hydrogen, methyl or ethyl.

2. The method of claim 1 in which $R^4$ is hydrogen and $R^3$ is methyl or hydrogen.

3. The method of claim 2 in which $R^1$ and $R^2$ independently represent at least one substituent selected from the group consisting of hydrogen, $C_1$-$C_4$ alkyl, $C_1$-$C_4$ alkoxy and nitro.

4. The method of claim 3 in which $R^3$ is hydrogen.

5. The method of claim 4 in which each compound of formula (I) is present at a level from 0.05 ppm to 20 ppm.

6. The method of claim 5 in which at least one of $R^1$ and $R^2$ represents a substituent other than hydrogen.

7. The method of claim 6 in which $R^1$ and $R^2$ independently represent at least one substituent selected from the group consisting of hydrogen, $C_1$-$C_2$ alkyl, $C_1$-$C_2$ alkoxy and nitro.

8. The method of claim 7 in which each compound of formula (I) is present at a level from 0.1 ppm to 10 ppm.

9. A method for identifying a petroleum hydrocarbon, biodiesel fuel or ethanol fuel marked with at least one compound having formula (I)

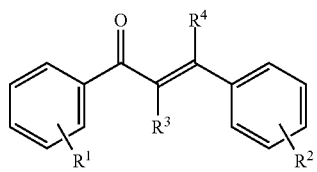

(I)

wherein $R^1$ and $R^2$ independently represent at least one substituent selected from the group consisting of hydrogen, $C_1$-$C_{12}$ alkyl, $C_1$-$C_{12}$ alkoxy and nitro; and $R^3$ and $R^4$ independently represent hydrogen, methyl or ethyl; wherein each compound of formula (I) is present at a level from 0.05 ppm to 20 ppm; said method comprising separating each compound of formula (I) using a chromatographic method and identifying each compound of formula (I) by mass spectral analysis.

10. The method of claim 9 in which $R^3$ and $R^4$ are hydrogen, at least one of $R^1$ and $R^2$ represents a substituent other than hydrogen and $R^1$ and $R^2$ independently represent at least one substituent selected from the group consisting of hydrogen, $C_1$-$C_4$ alkyl, $C_1$-$C_4$ alkoxy and nitro.

* * * * *